April 3, 1928.
L. A. WEIL ET AL
1,664,442
MECHANICAL STUD DRIVING DEVICE
Filed June 19, 1925        2 Sheets-Sheet 1
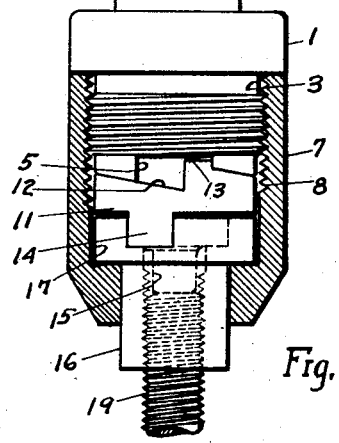
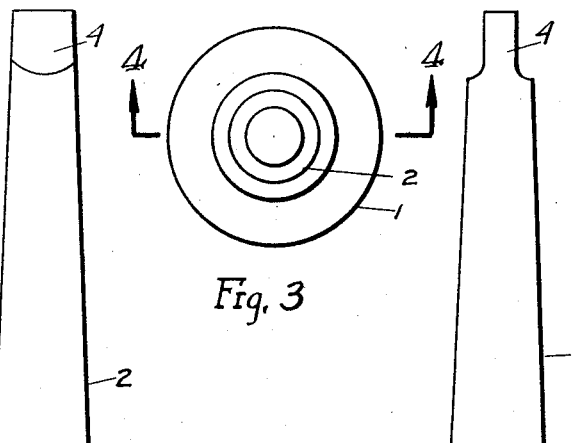
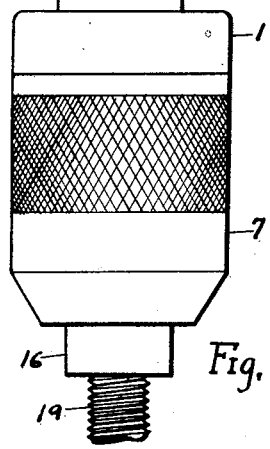
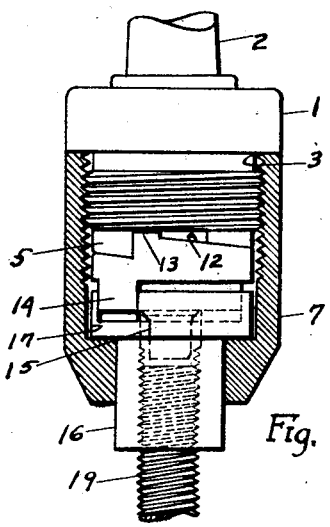
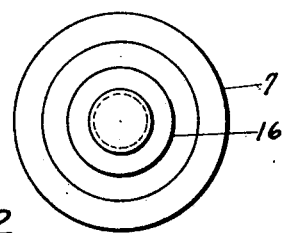
JOINT INVENTORS
Louis A. Weil
Charles F. Weil
By Myron J. Dikeman
ATTORNEY April 3, 1928.

L. A. WEIL ET AL 1,664,442

MECHANICAL STUD DRIVING DEVICE

Filed June 19, 1925   2 Sheets-Sheet 2

JOINT INVENTORS
Louis A. Weil
Charles F. Weil
By Myron J. Dikeman
ATTORNEY

Patented Apr. 3, 1928.

1,664,442

UNITED STATES PATENT OFFICE.

LOUIS A. WEIL AND CHARLES F. WEIL, OF DETROIT, MICHIGAN.

MECHANICAL STUD-DRIVING DEVICE.

Application filed June 19, 1925. Serial No. 38,291.

The object of our invention is to produce a mechanical device, for screwing and setting threaded bolt studs into machine parts, without the use of hand tools, and without injury to the threaded bolt.

Another object is to produce a stud driver that can be operated by a power machine, for screwing threaded studs in machine parts, and that will automatically release the stud for removing the device therefrom.

A further object is to produce a stud driver that will lock the threaded stud therein when rotated in a forward direction, and automatically release the stud when rotated in the reverse direction.

A still further object is to produce a stud driver that is simple in construction, easily attached and detached to any threaded stud, efficient in its operation and can be manufactured at a low cost.

These several objects are attained in the preferred form by the construction and arrangement of parts more fully hereinafter set forth.

Similar parts on all drawings are marked by similar numerals.

Fig. 1, shows the device in its assembled form, and holding a threaded stud bolt therein.

Fig. 2, is the bottom view of Fig. 1.

Fig. 3, is a top view of Fig. 1.

Fig. 4, is a sectional view 4—4 taken on the center line of Fig. 3, and illustrates the position of the operating mechanism when the driver is being rotated in a forward direction, and for locking the stud therein.

Fig. 5, is a sectional view similar to Fig. 4, showing the position of the same mechanism, in a reverse rotation of the device, when the stud is released therein.

Figure 6:
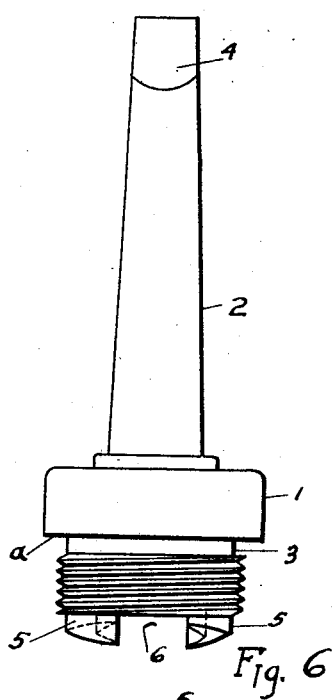
Fig. 6, shows a detail of the driving head and the connected operating cams attached thereto.
Figure 7:
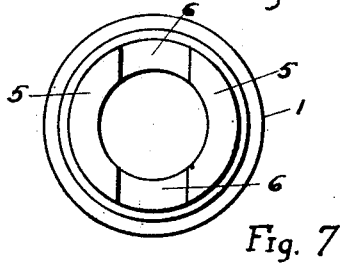
Fig. 7, is a bottom view of Fig. 6, showing the relative position of the operation cams.
Figure 14:
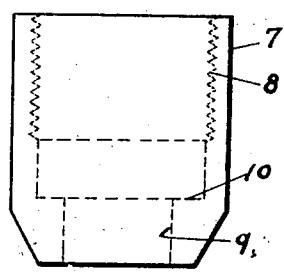
Fig. 14 is a side view of the cylindrical sleeve which incloses and retains the operating parts within the device.
Figure 9:
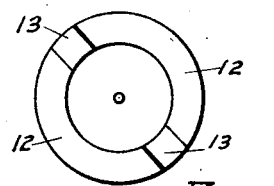
Fig. 9, is a top view of the cam shown in Fig. 8.
Figure 8:
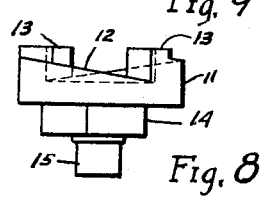
Fig. 8, is a detail of the locking cam.
Figure 10:
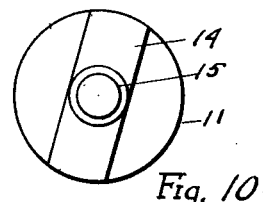
Fig. 10, is a bottom view of Fig. 8, showing the drive bar attached.
Figure 12:
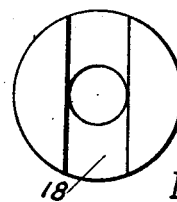
Fig. 12, is a top view of Fig. 11.
Figure 11:
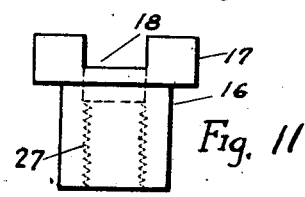
Fig. 11, is a special driving thimble for the stud.
Figure 13:
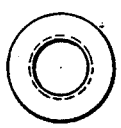
Fig. 13, is the bottom view of Fig. 11.

We will now describe more fully the detailed construction of our device, referring to the drawings and the marks thereon.

The device comprises a driving head having a standard tapered spindle thereon, for inserting in the rotating sleeve of a power machine, as is ordinarily used on tools of similar nature, and the driving head having a cylindrical casing attached thereto for holding and retaining the operating mechanism therein. An internally threaded driving thimble projects from the end of the device for receiving the threaded studs therein, and supported by movable locking cams which operate automatically against the end of the inserted stud, for locking and releasing the stud therein, as the device is rotated in a forward direction for driving the stud into machine parts, or reversed in detaching the device therefrom.

The driving head comprises a cylindrical collar —1—, having the tapered shank —2— attached to the end thereof, and a projecting threaded stud —3— positioned on the opposite end thereof. The driving head is preferably turned out of one solid piece of steel, and the driving spindle —2— formed to a standard machine taper, as is now adopted and used in this class of tools, for inserting within the power spindle of a drill press, or similar machines. The spindle is provided with a flattened end for engaging a slotted recess to prevent same from turning within the power sleeve. The threaded stud —3— is formed of a smaller diameter than the collar —1—, providing a shoulder —a— thereon. The outer end of the threaded stud —3— is provided with two projecting helical cam slides —5—, positioned on opposite edges of the stud body —3—, and are separated by the rectangular recess —6— which extends diametrically across the end of the plug, thus forming two left hand helical slides —5— thereon. To the outside of the threaded stud —3— is fitted a cylindrical nose casing —7—, also made of steel and provided with internal threads —8— therein, for engaging the threads on the stud —3— and screwing thereon firmly against the shoulder —a—, of the collar —1—. The outside diameter of the casing —7— is the same as the collar —1—, merely for appearance in design only.

Within the outer end of the casing —7— is formed a bearing —9— and retaining shoulder —10—. Placed within the casing —7—, and adjacent to the stud cams —5— of the driving head, is placed a disc locking cam —11—, also provided with two helical cam slides —12—, formed of a slope and diameter to fit and engage the stud cams —5— of the driving head. The slide cams —12— is positioned on opposite edges of the disc —11—, on the same side thereof, and separated by a projecting bar tooth —13—, for engaging the slot —6— in the end of the stud —3—. The bar tooth —13— is much narrower than the width of the slot —6—, for allowing the locking cam —11— to turn slightly along the cams —5— and —12—. On the opposite side of the disc locking cam —11— is formed a drive bar —14—, rectangular in form, and extending diametrically across the face of the disc —11—. In the center of the drive bar —14—, and concentric with the disc —11—, is a locking pin —15—, and positioned on the axis of the disc. Outside of the locking disc —11—, and adjacent thereto, is placed the driving thimble —16— rotatably mounted in bearing —9—. The thimble —16— is a hollow cylindrical form, made of hardened steel, and is provided with internal threads —27— therein, positioned concentric with the axis of the thimble, and the opening extending the entire length of the thimble. At one end of the thimble —16— is formed a projecting support collar —17—, being also circular in form, and concentric with the thimble cylinder —16—. Across the outer face of the collar —17—, positioned diametrically thereon, is the drive slot —18—, rectangular in section and of a size to receive the drive bar —14— of the locking cam —11—, and having the projecting locking pin —15— thereon, inserted within the threaded opening —27— of the driving thimble —16—. The outside diameter of the sleeve cylinder —16— is of a size to fit freely within the bearing —9— in the end of the nose sleeve —7—, while the collar —17— is of a diameter to allow it to slide within the casing —7— and engage the projecting shoulder —10— therein, and forming a rigid support for the driving thimble. The depth of the opening within the nose casing —7—, between the shoulder —10— and the open end thereof, being such as will allow approximately $\frac{1}{32}$ of an inch movement along the axis thereof of the locking disc cam —11— and the drive thimble —16—, as the disc cam —11— rocks back and forth within the slot —6— of the driving head, and which space is taken up, or adjusted by the action of the cam disc. Figs. 4 and 5 show the assembled device with the threaded stud bolt —19— inserted therein, ready for driving the stud into other machine parts. Fig. 5 shows the disc locking cam —11— rotated to the lowest side of slot —6— on the supporting helical cams —5—, which allows the disc cam —11— to recede slightly along the line of the axis, and away from the driving thimble —16—, drawing therewith the drive bar —14— and the locking pin —15—, back from the engaging recesses of the driving thimble —16—. The threaded stud —19— is then screwed within the driving thimble —16— until the end thereof engages the end of the locking pin —15— which projects within the threaded opening, thus holding the disc —11— and driving thimble —16— slightly apart. In operation, the shank —2— of the driving head, is held firmly within a rotating power sleeve of an operating machine, and is rotated to the right, for driving right hand threaded studs, and exerts a torsional pressure along the stud cams —5—, caused by the resistance from the turning of the stud bolt —19— into machined parts, and which reacts along the driving thimble —16— and connected locking cam —11—, and causing a slipping between the helical cam slides —5— and —12—, forcing the cam —11— and locking pin —15— outward and against the end of the stud bolt —19—, as shown in Fig. 4. firmly and securely locking same therein while screwing the stud —19— into other parts. When the stud bolt —19— is screwed in place and to the desired depth, the rotation of the driving head is then reversed to the opposite direction, thus releasing the torsional pressure on the cams —5— and —12—, allowing the locking disc —11— to rock to the other side of the slot —6—, releasing the pressure on the locking pin —15— against the end of the stud bolt —19—, which leaves the stud thimble —16— free to unscrew from the stud bolt. Various size of thimbles —16— may be inserted within the casing, for adapting the driver to different size stud bolts.

Having fully described our stud driver, what we claim as our invention and desire to secure by Letters Patent is:

1. A stud driver adapted to a power machine for setting threaded stud bolts into machine parts, comprising a cylindrical driving head, means for attaching the said driving head for the power spindle of an operating machine, a cylindrical casing attached to the driving head for retaining the working parts therein, helical cams formed on the end of the driving head, a threaded stud driving thimble mounted in the end of the cylindrical casing and projecting therefrom, a helical cam locking disc interposed between the end of the driving head and the driving thimble, and means for locking and driving a threaded stud therein.

2. A stud driving device adapted for setting threaded stud bolts in machine parts by use of a power operating machine, comprising a cylindrical driving head having helical driving cams formed on one end thereof, a driving spindle projecting from the other end of said driving head, a hollow cylindrical casing attached to the end of said driving head and enclosing said driving cams thereon, a threaded stud driving thimble mounted in the end of said casing, a disc locking cam having helical slides formed thereon interposed between the driving cams on the end of the driving head and the stud driving thimble, means for attaching the said cam disc to the stud driving thimble, and means for locking a threaded stud bolt within the stud driving thimble.

3. A stud driving device adapted for setting threaded stud bolts in machine parts by use of a power operating machine, comprising a threaded cylindrical driving head having projecting helical driving cams formed on one end thereof and a tapered driving spindle formed on the opposite end of said driving head, a hollow internally threaded cylindrical casing for connecting with the threaded portion of the said driving head, a cylindrical stud driving thimble movably mounted within the outer end of said driving head casing, said driving thimble having an opening through the center thereof and provided with internal threads for receiving a threaded stud bolt therein, and supported therein by a projecting collar fixedly attached to the inner end of said thimble, a disc locking cam having helical slides formed on one side thereof for fitting and engaging the driving cams on the end of the driving head, said cam being interposed between the said driving cams and the said stud driving thimble collar, a projecting driving bar formed on the side of the cam disc opposite the helical cam slides, for engaging and driving the stud driving thimble as the driving head is caused to rotate by the power operating machine, and means for locking the stud bolt within the threaded stud driving thimble.

4. A stud driver adapted for screwing and setting threaded stud bolts in machine parts, comprising a threaded cylindrical driving head having helical driving cams projecting from one end thereof and a tapered driving spindle projecting from the other end of said driving head, a hollow cylindrical casing having internal threads therein for fitting and engaging the threaded section of the driving head, said casing being formed with a bearing at the outer end thereof and concentric with the axis of the driving spindle, and having a shouldered support formed inside of said casing also concentric with the axis of the driving spindle and the casing bearing, a cylindrical stud driving thimble mounted in said casing bearing, said driving thimble having a supporting collar formed thereon for engaging the shouldered projection inside the casing, and having a rectangular groove formed across the face of said collar, a disc locking cam having helical slides formed on one side thereof corresponding to the helical driving cams on the end of said driving head, and a rectangular driving bar formed on the opposite side of said cam disc, interposed between the driving cams on the end of the driving head and the said stud driving thimble, and having the driving bar engaging the rectangular groove in the driving thimble collar, and a locking pin formed on said disc driving bar and projecting within the center threaded opening of the stud driving thimble.

5. A stud driving device adapted for screwing threaded studs into machine parts, comprising a threaded cylindrical driving head having two helical driving cams projecting from the threaded end thereof, said helical driving cams being positioned on opposite edges of the said driving head and are separated by a rectangular recess positioned diametrically across the end of said driving head, a tapered driving spindle formed on the opposite end of the driving head cylinder, a hollow cylindrical casing having internal threads therein for fitting and engaging the threaded section of the driving head, said casing being formed with a bearing in the outer end thereof provided with an inside shoulder therein both concentric with the axis of the driving head and driving spindle, a hollow cylindrical stud driving thimble mounted within the end bearing of the driving head casing, and movable therein, said driving thimble having a projecting collar formed on the inside end thereof for engaging the shoulder of the head casing, said projecting collar formed with a rectangular recess across the face thereof, a disc locking cam having two helical locking cam slides formed on one side thereof, interposed between said drive cams on the end of the driving head and the said stud driving thimble collar, said helical cam slides positioned on the opposite edges of the cam disc, but on the same side thereof, and separated by a small projecting tooth for engaging and moving within the rectangular recess on the end of the driving head, a driving bar formed on the disc locking cam across the side opposite the helical cam slides, for engaging the rectangular recess in the face of the stud driving thimble collar, a lock pin formed on the center of the disc driving bar for projecting into and engaging the hollow recess through the stud driving thimble.

In witness whereof we sign these specifications.

LOUIS A. WEIL.
CHARLES F. WEIL.